United States Patent
Yang et al.

(10) Patent No.: US 7,148,639 B2
(45) Date of Patent: Dec. 12, 2006

(54) VOLTAGE COMPENSATING CIRCUIT FOR A SENSORLESS TYPE DC BRUSHLESS MOTOR

(75) Inventors: Ming-Che Yang, Taichung Hsien (TW); Tai-Ming Huang, Kaohsiung Hsien (TW); Chih-Hsin Chen, Hsinchu (TW); Mu-Ping Chen, Hsinchu (TW); Chih-Hsing Fang, Hsinchu (TW); Kuo-Ing Hwu, Hsinchu Hsien (TW)

(73) Assignee: Industrial Technology Research Institute (TW)

( * ) Notice: Subject to any disclaimer, the term of this patent is extended or adjusted under 35 U.S.C. 154(b) by 0 days.

(21) Appl. No.: 11/316,915

(22) Filed: Dec. 27, 2005

(65) Prior Publication Data

US 2006/0145641 A1    Jul. 6, 2006

(30) Foreign Application Priority Data

Dec. 31, 2004    (TW) ............................. 93141807 A

(51) Int. Cl.
*H02P 6/18*    (2006.01)
(52) U.S. Cl. ..................... 318/254; 318/439
(58) Field of Classification Search ............... 318/138, 318/254, 439, 621, 632, 720–724
See application file for complete search history.

(56) References Cited

U.S. PATENT DOCUMENTS

| | | | | | |
|---|---|---|---|---|---|
| 3,906,320 | A | * | 9/1975 | Doemen | 318/254 |
| 4,306,181 | A | * | 12/1981 | Welburn | 318/696 |
| 4,562,393 | A | * | 12/1985 | Loyzim et al. | 318/599 |
| 4,744,018 | A | * | 5/1988 | Eccleston | 363/16 |
| 5,053,688 | A | * | 10/1991 | Rees | 318/599 |

* cited by examiner

*Primary Examiner*—Bentsu Ro

(57) ABSTRACT

A compensating circuit for compensating the terminal voltage on the armature in a sensorless type DC brushless motor apparatus is described. The driving circuit of the motor apparatus outputs a three-phase power, and each phase is connected with a compensating circuit. The compensating circuit has a reference voltage, a resistance device, a diode device, a differential amplifier and a processor. The two terminals of the resistance device are respectively connected to the reference voltage and the anode of the diode device. The cathode of the diode device is connected to an output of the three-phase power supply. The two input terminals of the differential amplifier are respectively connected to the two terminals of the resistance device. The processor accepts the signal output from the differential amplifier and then calculates and outputs a compensating voltage.

13 Claims, 2 Drawing Sheets

VOLTAGE COMPENSATING CIRCUIT FOR A SENSORLESS TYPE DC BRUSHLESS MOTOR

RELATED APPLICATIONS

The present application is based on, and claims priority from, Taiwan Application Serial Number 93141807, filed Dec. 31, 2004, the disclosure of which is hereby incorporated by reference herein in its entirety.

BACKGROUND

1. Field of Invention

The present invention relates to a voltage compensating circuit. More particularly, the present invention relates to a voltage compensating circuit for a sensorless type DC brushless motor.

2. Description of Related Art

In the field of motors, the three-phase brushless motor is a kind of motor apparatus with high power efficiency; moreover, the volume thereof can be reduced more easily than that of other kinds of motor. Therefore, the DC brushless motor is well suited to every kind of 3C production and is now in widespread use.

The three-phase DC brushless motor is a kind of electrical commutation motor (ECM). The basic design of the three-phase DC brushless motor is determining the position of the armature in the motor at first, then appropriately varying the excitation on the armature to induce a magnetic field with different directions, and then the armature can be driven by the induced magnetic field. That is to say, a driving circuit varies the direction of the induced magnetic field as long as the position of the armature is changed, and then the induced magnetic field drives the armature again. The armature will thus continuously rotate when the action above-mentioned is continued. According to the directional track of the varied magnetic field, it can be seen that the magnetic field induced by the armature is a rotating magnetic field.

According to the basic design, only the position of the armature is precisely determined, the direction of the induced magnetic field can be correctly determined, and the efficiency of the motor can be maintained. Hence, a position detector is usually attached with the conventional three-phase brushless DC motor for determining the position of the armature. In consideration of the tendency towards production miniaturization and cost reduction, a technique has been developed to determine the position of the armature without the position detector, that is, a sensorless detection technique.

The present sensorless detection technique comprises an indirect induced potential detection and a direct induced potential detection. The operation of the indirect induced potential detection includes fetching the voltages from the three terminals and the neutral point at first, transmitting the voltages into a filter, a voltage attenuator and a position detector in order, and generating a commutation signal. The induced potential obtained by the indirection induced potential detection has some problems, including a low signal-to-noise ratio (SNR) and delay; hence, the position of the armature cannot be precisely determined. Therefore, a direct induced potential detection was developed.

The difference between direct induced potential detection and indirect induced potential detection is that the direct induced potential only fetches the voltages from the three terminals, and then transmits them into a voltage clamper for overcoming the problems of the indirect induced potential detection. But an error will be caused by the voltage drops on the switch and the diode devices in the driving circuit of the DC brushless motor, and the error will cause jittering and efficiency degradation when the DC brushless motor is operating.

FIG. 1 shows a basic equivalent circuit of a conventional three-phase DC brushless motor apparatus. The three-phase DC brushless motor apparatus comprises a driving circuit and a motor. A power supply $V_I$ is used to provide the current needed by the operation of the motor. Switch devices $S_1$–$S_6$ and diode devices $D_1$–$D_6$ constitute the driving circuit of the three-phase brushless DC motor. Induction coils $L_A$–$L_C$, resistor $R_A$–$R_C$ and induced potential $e_A$–$e_C$ respectively indicate the induction coils of the A, B and C phases on the armature in the motor, equivalent resistances, and the induced potential induced by the induction coils. Moreover, a neutral point is formed by connecting one terminal of A, B and C phase to each other.

The switch devices $S_1$–$S_6$ are connected with a controlling signal. The purpose of the controlling signal is to turn on and turn off the switch devices $S_1$–$S_6$ in order to enable the current provided by the power supply $V_I$ to pass continuously and transiently through the two of the induction coils $L_A$–$L_C$, and thereby to excite and produce a magnetic field to rotate the armature of the motor. Hence the direction of the magnetic field is determined by the direction of the current, the input phase of the current is determined by the upper arm switch devices $S_1$, $S_3$, and $S_5$ and the output phase of the current is determined by the lower arm switch devices $S_2$, $S_4$, and $S_6$.

Therefore, position detection is defined as detecting the present position the armature in the motor for determining the direction of the magnetic field needed by the armature to be rotated to the next position, and can determine which switch devices of the switch devices $S_1$–$S_6$ should be turned on to excite the induction coils on the armature to produce the magnetic field with a desired direction.

In the aspect of the above-mentioned direct induced potential detection, an induced voltage $V_N$ the neutral point $N_P$ is an important parameter. The voltage $V_N$ can be obtained by measuring the terminal voltages of the phase not being excited, because, in an excitation, the current passes through only two coils. Because the induced voltage value on the neutral point is desired, the measuring should be carried out in a transient without current. Referring to FIG. 1, the induced coils $L_B$ and $L_C$ are excited by the current provided by the power supply $V_I$, and the current passes through the turned on switch devices $S_3$ and $S_6$. Then, in the moment the switch device $S_3$ is turned off, induced potentials $e_B$, $e_C$, and an induced current I are produced from induced coils $L_B$ and $L_C$ because the current provided by the power supply $V_I$ cannot flow into the armature in the motor.

The induced current. I passes through the loop comprising the switch device $S_6$ and the diode device $D_4$; therefore, according to the principals of circuit analysis, the ideal induced voltage $V_N$ at the neutral point is:

$$V_N = e_A/2$$

Thus, a voltage $V_A$ can be measured on a node $N_A$:

$$V_A = 3e_A/2$$

that is to say, the desired neutral voltage $V_N$ can be measured via the voltage $V_A$ on the node $N_A$.

In general, voltage drops of voltage $V_S$ and $V_D$ respectively appear at the switch device $S_6$ and diode device $D_4$ when the induced current I passed through; therefore, the induced voltage $V_N$ on the neutral $N_P$ in practice is:

$$V_N = (e_A/2) + [(V_S - V_D)/2]$$

Also, the voltage $V_A$ measured at the node $N_A$ becomes:

$$V_A = (3e_A/2) + [(V_S - V_D)/2]$$

It can be seen that an error of $(V_S - V_D)/2$ occurs, and the error causes a jitter and low efficiency.

SUMMARY

It is therefore an objective of the present invention to provide a compensating circuit for compensating the terminal voltages of a sensorless DC brushless motor.

It is another objective of the present invention to provide a compensating circuit for promoting the stability of a sensorless DC brushless motor.

It is still another objective of the present invention to provide a compensating circuit for promoting the efficiency of a sensorless DC brushless motor.

In accordance with the foregoing and other objectives of the present invention, the voltage compensating circuit is respectively connected to each phase of the three-phase power output of a driving circuit in a sensorless DC brushless motor apparatus comprising a motor and the driving circuit. The voltage compensating circuit comprises a reference voltage, a resistance device, a diode device, a differential amplifier and a processor. Two terminals of the resistance device are connected to the reference voltage and an anode of the diode device. A cathode of the diode device is connected to one phase of the three-phase power output. Two input terminals of the differential amplifier are respectively connected to the two terminals of the resistance device. The processor is used to accept the signal output from the differential amplifier and then output a compensating voltage after computing and processing.

BRIEF DESCRIPTION OF THE DRAWINGS

These and other features, aspects, and advantages of the present invention will become better understood with regard to the following description, appended claims, and accompanying drawings, where:

DESCRIPTION OF THE PREFERRED EMBODIMENTS

Figure 1:
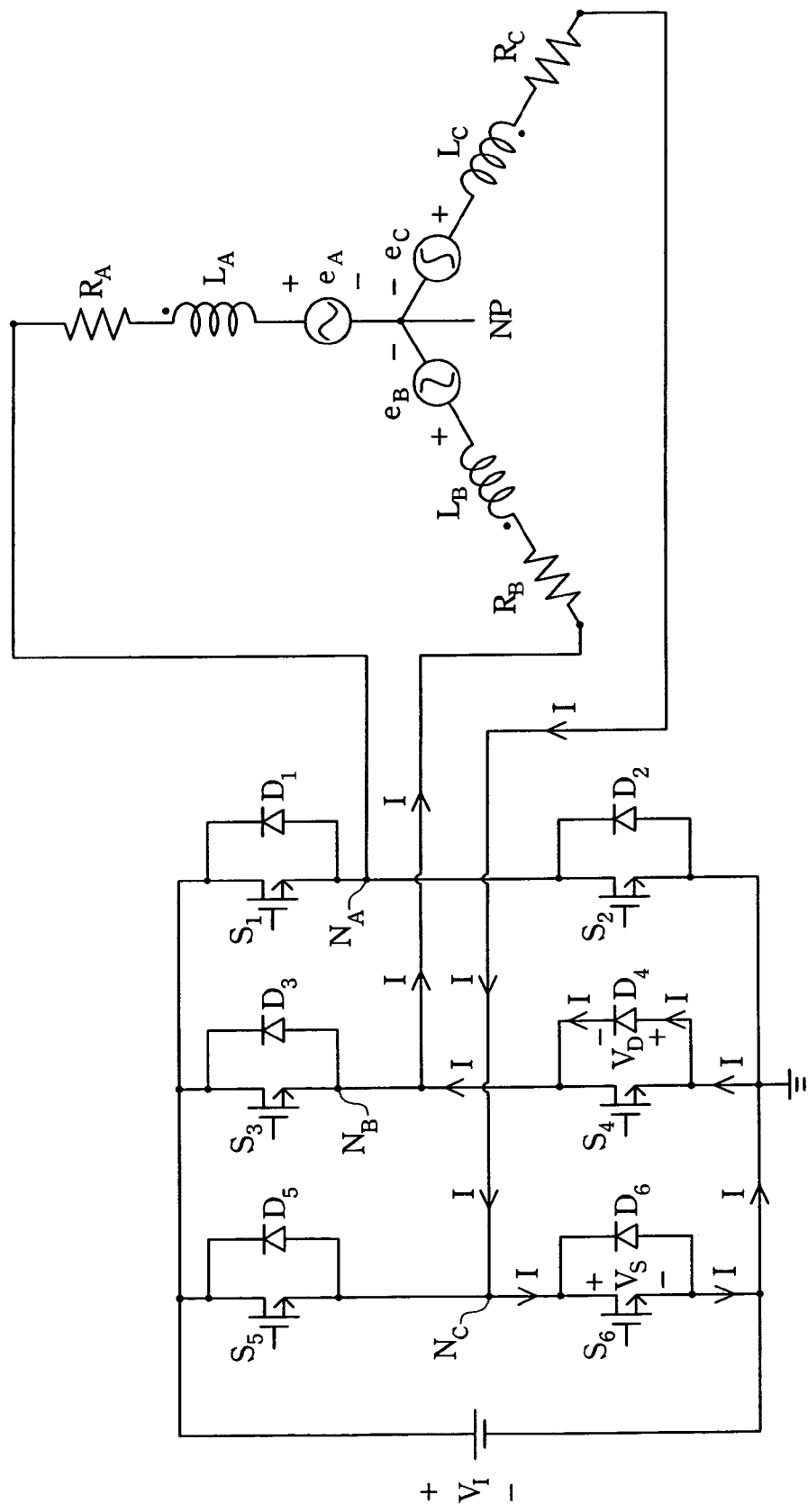
FIG. 1 illustrates an equivalent circuit diagram of the conventional DC brushless motor.

Reference will now be made in detail to the present preferred embodiments of the invention, examples of which are illustrated in the accompanying drawings. Wherever possible, the same reference numbers are used in the drawings and the description to refer to the same or like parts.

In the conventional sensorless DC brushless motor, a voltage with an error, which is $(V_S - V_D)/2$, is easily obtained by using direct induced potential detection to detect the position of the armature in the motor, where the voltages $V_S$ and $V_D$ are voltage drops at a switch device and a diode device, respectively, when an induced current passes through the driving motor. The voltage $V_S$ varies with the magnitude of the induced current; therefore, the compensating circuit according to the embodiment of the present invention comprises two parts, a measuring circuit used to measure the real error parameter, and a processing circuit used to carry out the computing and compensating operation.

Figure 2:
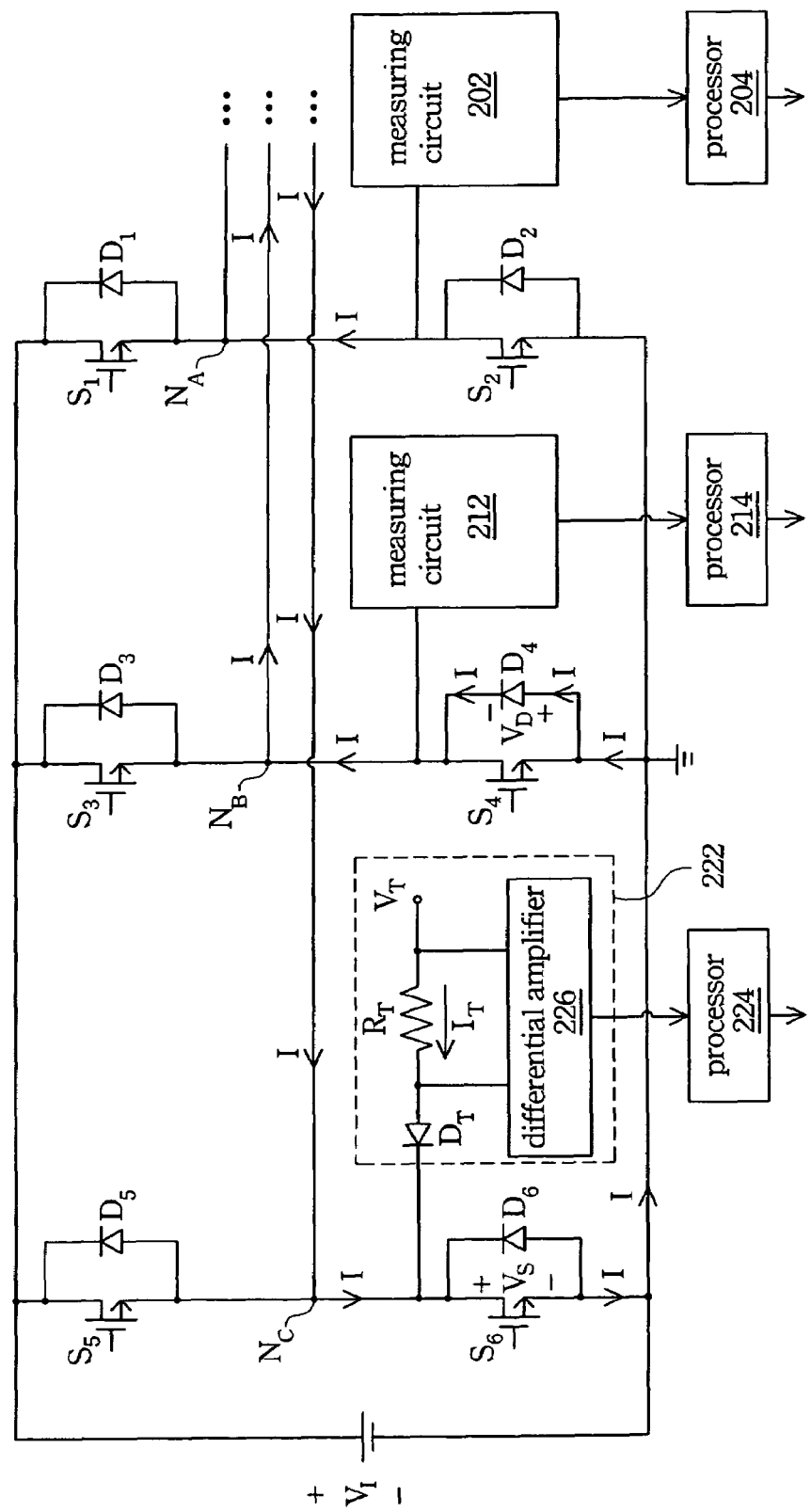
FIG. 2 illustrates a driving circuit diagram of the sensorless DC brushless motor in accordance with an embodiment of the present invention.

FIG. 2 shows a motor driving circuit with the compensating circuits according to the embodiment of the present invention, where the equivalent circuit of the motor shown in FIG. 1 is omitted. The compensating circuit is respectively connected to nodes $N_A$, $N_B$ and $N_C$, where the compensating circuit connecting with the node $N_A$ comprises a measuring circuit 202 and processor 204, the compensating circuit connecting with the node $N_B$ comprises a measuring circuit 212 and processor 214, and the compensating circuit connecting with the node $N_C$ comprises a measuring circuit 222 and processor 224. The circuit organizations of the measuring circuits 202, 212 and 222 all are the same, and the processor 204, 214 and 224 may be any processor able to compute the magnitude of voltage signal. The only difference between the compensating circuits is that the measuring circuit 202 and processor 204 are used to compensate a voltage $V_B$ on the node $N_B$, the measuring circuit 212 and processor 214 are used to compensate a voltage $V_C$ on the node $N_C$, and the measuring circuit 222 and processor 224 are used to compensate a voltage $V_A$ on the node $N_A$. Continuing with the conditions described in FIG. 1, only the theorem of the measuring circuit 222 and processor 224 is explained herein.

Referring to FIG. 2 and continuing with the conditions described in FIG. 1, the switch device $S_6$ is turned on, the switch devices $S_1$, $S_2$, $S_4$ and $S_5$ all are turned off, and the switch devices $S_3$ is in a transient state between being turned on and turned off. MOSFET devices are used as the switch devices in the embodiment. Under these conditions, a current I flowing toward the B phase of the motor and backing from the C phase of the motor is induced. After the induced current I backs from the C phase of the motor, it passes through the switch device $S_6$ and the diode device $D_4$ and then flows toward the B phase of the motor again to form a loop. In practice, the voltage drops of the voltages $V_S$ and $V_D$ will be produced at the switch device $S_6$ and the diode device $D_4$, respectively, when the induced current I passes through the switch device $S_6$ and the diode device $D_4$. An error of $(V_S - V_D)/2$ will then be produced by the voltage drops.

The circuit organizations of the measuring 202, 212 and 222 all are the same, comprising a resistance device $R_T$, a diode device $D_T$ and a differential amplifier 226. Two terminals of the resistance device $R_T$ are respectively connected to a reference voltage $V_T$ and the anode of the diode device $D_T$. The cathode of the diode device $D_T$ is connected to the drain of the switch device $S_6$. Two input terminals of the differential amplifier are respectively connected to the two terminals of the resistance device $R_T$.

According to the foregoing circuit organization, there is a reference current $I_T$ toward the switch device $S_6$ from the reference $V_T$, and the voltage drops are produced on the resistance device $R_T$ and the diode device $D_T$ when the reference current passes through the resistance device $R_T$ and diode device $D_T$. The voltage drop on the resistance device $R_T$ is $R_T \cdot I_T$, and the voltage drop on the diode device $D_T$ also is $V_D$ if the diode device $D_T$ is the same as the diode device $D_4$.

In general, the voltage drop on the diode device $D_4$ is a constant, that is, the voltage $V_D$, but the voltage drop on the switch device $S_6$, that is, the voltage $V_S$, varies with the magnitude of the induced current I. The magnitude of the voltage should therefore be determined first. The magnitude of the reference voltage $V_T$ may not be too large (e.g. about 5V); thus, the reference current $I_T$ can be omitted because it is far less than the induced current I, that is to say, the voltage drop on the switch device $S_6$, the voltage $V_S$, will not be influenced by the reference current $I_T$. Thus, the magnitude of the reference voltage $V_T$ is:

$$V_T = R_T \cdot I_T + V_D + V_S$$

and the magnitude of the voltage $V_S$ is:

$$V_S = V_T - R_T \cdot I_T - V_D$$

After the magnitude of the voltage $V_S$ is obtained, the magnitude of the error $(V_S - V_D)/2$ can be further obtained:

$$(V_S - V_D)/2 = (V_T - R_T \cdot I_T - V_D - V_D)/2$$

or $$(V_S - V_D)/2 = [(V_T - R_T \cdot I_T)/2] - V_D$$

In the equations, the reference voltage $V_T$ and the voltage $V_D$ are constants preset in the processor 224, and $R_T \cdot I_T$ can be obtained by the differential amplifier 226 in the measuring circuit 222 and then be output to the processor 224. Hence, $(V_S - V_D)/2$ can be obtained by computing in the processor 224 and can be used to compensate the voltage $V_A$ on the node $N_A$ shown in FIG. 1 from $(3e_A/2) + [(V_S - V_D)/2]$ to $3e_A/2$. Thus, the error produced within the measuring of the voltage $V_A$ and the jitter of the motor can be reduced, and the efficiency of the motor apparatus can be further enhanced.

Similarly, the measuring circuit 202 plus the processor 204 can compensate the voltage $V_B$ at the node $N_B$, and the measuring circuit 212 plus the processor 214 are able to compensate the voltage $V_C$ on the node $N_C$.

According to the driving theorem of DC brushless motor, one of two timings for compensating the voltage $V_A$ is in the transient state where the switch device $S_3$ is between being turned on and being turned off when the switch device $S_6$ is turned on, and the other one is in the transient state where the switch device $S_5$ is between being turned on and being turned off when the switch device $S_4$ is turned on. One of two timings for compensating the voltage $V_B$ is in the switch device $S_1$ when in the transient state between being turned on and turned off when the switch device $S_6$ is turned on, and the other one is in the switch device $S_5$ when in the transient state between being turned on and turned off when the switch device $S_2$ is turned on. One of two timings for compensating the voltage $V_C$ is in the switch device $S_1$ when in the transient state between being turned on and turned off when the switch device $S_4$ is turned on, and the other one is in the switch device $S_3$ when in the transient state between being turned on and turned off when the switch device $S_2$ is turned on. Therefore, a control signal may be used to enable the processor 224 only if the voltage $V_A$ on the node $N_A$ needs to be compensated. Similarly, the processor 204 may be enabled only if the voltage $V_B$ on the $N_B$ needs to be compensated, and the processor 214 may be enabled only if the voltage $V_C$ on the $N_C$ needs to be compensated. In addition, the processors 204, 214 and 224 may be integrated to a processor unit.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A sensorless DC brushless motor apparatus, comprising:
    a driving circuit;
    a motor, wherein said motor is connected with said driving circuit via the three-phase power output terminal of said driving circuit; and
    a plurality of compensating circuits, wherein each of said compensating circuits comprises a resistance device, a diode device, a differential amplifier and a processor, two terminals of said resistance device are respectively connected to a reference voltage and the anode of said diode device, the cathode of said diode device is connected to the three-phase power output terminal of said driving circuit, the two input terminals of said differential amplifier are respectively connected to the two terminals of said resistance device, and said processor is used to accept a voltage signal output from said differential amplifier and then output a compensating voltage for compensating the voltage at the three-phase power output terminal of said driving circuit.

2. The motor apparatus of claim 1, wherein said differential amplifier is used to measure a voltage drop at said resistance device.

3. The motor apparatus of claim 1, wherein said reference voltage is about 5V.

4. A sensorless DC brushless motor apparatus, comprising:
    a driving circuit;
    a motor, wherein said motor is connected with said driving circuit via the three-phase power output terminal of said driving circuit;
    a plurality of compensating circuits, wherein each of said compensating circuits comprises a resistance device, a diode device and a differential amplifier, wherein the two terminals of said resistance device are respectively connected to a reference voltage and the anode of said diode device, the cathode of said diode device is connected to the three-phase power output terminal of said driving circuit, the two input terminals of said differential amplifier are respectively connected to the two terminals of said resistance device; and
    a processor, wherein said processor is used to accept a voltage signal output from said differential amplifier and then output a compensating voltage for compensating a voltage at the three-phase power output terminal of said driving circuit.

5. The motor apparatus of claim 4, wherein said differential amplifier is used to measure a voltage drop on said resistance device.

6. The motor apparatus of claim 4, wherein said reference voltage is about 5V.

7. A method for compensating a terminal voltage on a three-phase power output terminal of a driving circuit in a sensorless DC brushless motor apparatus, comprising:
    providing a plurality of measuring circuits connected to the three-phase power output terminal of said driving circuit, wherein each of said measuring circuits comprising a resistance device and a diode device, the two terminals of said resistance device are respectively connected to a reference voltage and the anode of said diode device, the cathode of said diode device is connected to the three-phase power output terminal of said driving circuit;

measuring a voltage drop at said resistance device;
computing a compensating voltage, wherein the voltage drop at said resistance device is a parameter in said computing step; and
using said compensating voltage to compensate said terminal voltage.

8. The method of claim 7, wherein each of said measuring circuit further comprising a differential amplifier, and two input terminals of said differential amplifier are respectively connected to the two terminals of said resistance device.

9. The method of claim 8, wherein the voltage drop on said resistance device is measured by said differential amplifier.

10. The method of claim 8, further comprising at least one processor used to accept an output signal of said differential amplifier.

11. The method of claim 10, wherein said computing step is carried out by said processor.

12. The method of claim 7, wherein an equation of said computing step is $[(V_T-R_T \cdot I_T)/2]-V_D$, wherein $V_T$ is said reference voltage, $R_T \cdot I_T$ is the voltage drop at said resistance device, and $V_D$ is a voltage drop at said diode device.

13. The method of claim 7, wherein said reference voltage is about 5V.

* * * * *